United States Patent [19]

Krofchak

[11] 4,110,212

[45] Aug. 29, 1978

[54] METHOD OF TREATING A WASTE LIQUID CONTAINING POLLUTING COMPOUNDS

[76] Inventor: David Krofchak, 470 Collier MacMillan Dr., P.O. Box 1060, Cambridge, Ontario, Canada, N1R 5Y7

[21] Appl. No.: 789,750

[22] Filed: Apr. 21, 1977

[51] Int. Cl.$^2$ ............................ C02B 1/20; C02C 5/02
[52] U.S. Cl. ...................................................... 210/53
[58] Field of Search ........................ 210/46, 51, 53, 59

[56] References Cited

U.S. PATENT DOCUMENTS

| | | | |
|---|---|---|---|
| 3,183,186 | 5/1965 | Oster | 210/10 |
| 3,342,731 | 9/1967 | Baumann | 210/51 |
| 3,404,088 | 10/1968 | Dujardin | 210/53 |
| 3,763,038 | 10/1973 | Misaka | 210/53 |
| 3,928,195 | 12/1975 | Hoeltgen et al. | 210/53 |
| 4,025,430 | 5/1977 | Pagel | 210/53 |

*Primary Examiner*—Thomas G. Wyse
*Attorney, Agent, or Firm*—Robert F. Delbridge; Arne I. Fors

[57] ABSTRACT

Waste liquid containing polluting compounds with an acidic ferrous salt solution to adjust the pH of the liquid to a value within the range of from about 2 to about 5 and to reduce polluting compounds in the waste liquid to a form capable of reacting with an alkali to produce a precipitate. The adjusted waste liquid is then reacted with an alkali to raise the pH of the liquid to a value within the range of from about 9 to about 12.5 and to produce said precipitate. The alkaline waste liquid is then reacted with a silicic compound to form large complex silicate molecules with the precipitate and consequent solidification of the waste liquid into a stable, non-polluting solid.

8 Claims, No Drawings

METHOD OF TREATING A WASTE LIQUID CONTAINING POLLUTING COMPOUNDS

This invention relates to the treatment of waste liquids which contain polluting compounds, the term "liquid" being intended to cover aqueous solutions and other liquid-like materials including slurries, sludges, silts and slimes.

As is well known, pollution of the environment by waste liquids is a serious problem, and intense efforts are being made to deal with the problem so as to reduce pollution of the environment as much as possible. Industrial wastes are a major source of waste liquids containing polluting compounds. Such waste liquids are produced by many manufacturing industries, for example, the steel, automobile, metal plating, tannery and drum reconditioning industries. Sludges from waste water treatment plants are also examples of waste liquids containing polluting compounds. Also, mines and associated metal refineries are notorious producers of waste liquids containing polluting compounds. For example, tailings from refiners of gold, copper and uranium, to name but a few, contain very undesirable polluting compounds. Similarly, sewage plants also produce waste liquids containing polluting compounds, and harbour dredgings are another example of such waste liquids.

The actual nature of the polluting compounds in waste liquids vary widely, according to their source. Proposals for treating such waste liquids have, in the past, generally been directed to the treatment of specific waste liquids containing specific polluting compounds, and have not been widely applicable to different waste liquids containing various different polluting compounds. Also, such prior proposals have frequently been expensive to operate because of the large quantities and/or cost of the reagents used.

In fact, the only solution to the problem in many cases is to store or dump the waste liquids in lagoons on the surface of the earth or dispose of them in an underground cavern. Many of the waste liquids dumped in this manner have high concentrations of extremely contaminating polluting compounds, and as is well known, such polluting compounds often manage to pass into the surrounding environment, often with disastrous results.

It is therefore an object of the present invention to provide a process for treating waste liquids containing polluting compounds which is useful for treating waste liquids with many different types of organic and inorganic polluting compounds and which uses relatively small quantities of relatively inexpensive reagents.

According to the invention, a method of treating waste liquids containing polluting compounds includes reacting the waste liquid with an acidic ferrous salt solution to adjust the pH of the liquid to a value within the range of from about 2 to about 5 and to reduce polluting compounds in the waste liquid to a form capable of reaction with an alkali to produce an inert precipitate, reacting the adjusted liquid with an alkali to raise the pH to a value within the range of from about 9 to about 12.5 and to produce said inert precipitate, and reacting the alkaline liquid with a silicic compound to form large complex silicate molecules with said precipitate with resultant solidification of the liquid into a stable pollution free solid material.

In this way, the waste liquid and its contained polluting compounds are converted into a stable pollution free solid material which, if desired, may be used in a variety of ways, for example as land fill or road foundations. The process can be carried out cheaply and effectively and produces an environmentally safe, non-toxic product which is of a soil-like nature.

The acidic ferrous salt solution may be a solution containing ferrous sulphate and sulphuric acid. The alkali may be lime, and caustic soda may be used in addition to or in place of the lime.

The silicic compound may be a compound which becomes active when the pH rises up into the range of from about 9 to about 12.5 so as to react with the alkaline liquid to form the large complex silicate molecules with the precipitate, the silicate compound being inactive when the pH is substantially below this range.

The silicic compound may be selected from the group consisting of sodium silicate, cement, fly ash, general ash, siliceous slag, clay, silt, sand, stone and soils of a silicic nature.

The adjusted liquid with pH in the range of from about 2 to about 5 may be reacted with an alkali to raise the pH to a value of about 9 and to produce said precipitate, and an alkaline earth metal compound may be added to raise the pH to a higher value and cause the silicic compound to form said large complex silicate molecules with said precipitate.

Many different types of waste liquids containing polluting compounds may be treated in accordance with the present invention. For example, waste liquids from the steel industry, the plating industry and the automobile industry may be so treated. Such waste liquids usually contain undesirably high concentrations of metal salts, such as chromium salts, which would be extremely harmful to the environment if such waste liquids leaked from a storage site into the surrounding soil and thence into a water source. Such polluting compounds are reduced by the acidic ferrous salt solution to a form capable of reacting with an alkali to produce an inert precipitate.

The invention can also be used with waste liquids from mining operations, such as refining operations for gold, copper and uranium. Sewage sludge and harbour dredgings are other examples of waste liquids containing polluting compounds which can be treated in accordance with the present invention.

The actual amount of acidic ferrous salt solution required in any particular case depends of course, upon the nature and concentration of polluting compounds present in the waste liquid concerned, and can be determined by routine trial and experiment. Usually, a ferrous ion concentration in the range of from about 10 grams per liter (1%) to about 100 grams per liter (10%) will be required. Further, the amount of acid required will be as much as is needed to adjust the pH to a value within the range of from about 2 to about 5. As mentioned above, the acidic ferrous salt solution may be a solution containing ferrous sulphate and sulphuric acid, the advantage being that these substances are readily obtainable and relatively inexpensive. The amount of ferrous sulphate required will usually be within the range of from about 30 grams per liter (3%) to about 300 grams per liter (30%), and the amount of sulphuric acid required will usually be within the range of from about 10 grams per liter to about 100 grams per liter.

The acidic ferrous salt solution is preferably mixed with the waste liquid by hydraulic and/or mechanical means and added in such an amount that free ferrous ions exist and the pH is between about 2 and about 5.

The adjusted liquid is then mixed with an alkali, such as lime, to raise the pH to a value within the range of from about 9 to about 12.5. The alkali then reacts with the reduced polluting compounds to produce an inert precipitate. The alkali is mixed with the adjusted liquid by hydraulic and/or mechanical means. Various methods may be employed depending on the nature and viscosity of the wastes and the best method to be used in any particular case will be readily apparent to a person skilled in the art.

The amount of alkali required depends upon the amount of polluting compounds and can be determined by routine trial and experiment in any particular instance. Usually, the amount of alkali required will be in the range of from about 0.1% to about 10% by weight.

The now alkaline liquid is reacted with a silicic compound in such a manner that the silicic compound forms large complex silicate molecules with the precipitate with resultant solidification of the liquid. The silicic compound is preferably mixed with the alkaline liquid by mechanical means for heavy materials, but various methods including pumps may be used where large quantities of pumpable materials are to be treated.

The amount of silicic compound required depends upon the amount of precipitate in the alkaline liquid, and can be determined by routine trial and experiment in any particular instance. Usually, the amount of silicic compound will be in the range of from 1% to 90%. Not all this amount may have to be added, since the waste liquid may contain some or all of the silicic compound required. For example, harbour dredgings may be 80% silicic compound.

The pH of the alkaline liquid and the nature of the silicate compound may be such that the reaction of the silicate compound with the precipitate begins as soon as the silicic compound is added. This will happen, for example, if the pH is about 10 and the silicic compound is selected from the group consisting of sodium silicate, cement, fly ash, general ash, siliceous slag, clays, silts, sands, stone and soil.

On the otherhand, the reaction between the silicic compound and the precipitate may not take place to any great extent until an alkaline earth metal compound has been added, with consequent raising of the pH to about 10 or preferably to 12-13. The alkaline earth metal compound may be selected from the group consisting of calcium oxide or hydroxide compounds, tri-calcium aluminum silicates, and magnesium or barium oxides. The reactions are often aided or speeded up by addition of other alkalis such as sodium hydroxide.

As in previous procedures, the amount of alkaline earth compound required can be determined by routine trial and experiment in any particular instance. Usually, the amount required will be in the range of from about 0.1% to about 10%.

Usually, the reaction between the silicic compound and the preicpitate is well advanced after a few hours, and is substantially complete within a few days. The actual time required of course depends upon the amount of polluting compounds originally present and the amount of reagents used.

Various examples of processes carried out in accordance with the present invention will now be described.

EXAMPLE 1

Various waste liquids obtained from the steel industry, the plating industry, and automobile industry and other general industries were mixed together with the composition of the waste liquid mixture being:

| | |
|---|---|
| Total Solids | 168,290 mg/liter |
| Dissolved Solids | 167,900 mg/liter |
| Sulphates | 93,000 mg/liter |
| Chlorides | 8,310 mg/liter |
| Calcium | 474 mg/liter |
| Chromium | 1,112 mg/liter |
| Copper | 64 mg/liter |
| Iron | 15,272 mg/liter |
| Manganese | 164 mg/liter |
| Nickel | 102 mg/liter |
| Zinc | 11,000 mg/liter |
| Lead | 21 mg/liter |

The various waste liquids were mixed in such a manner that excess ferrous iron existed in an acid condition so that highly toxic chemicals such as cyanide and hexavalant chromium would be converted to an easily treatable form. The pH of the waste liquid mixture was 2.4. 60 grams per liter of lime (CaO) were then added by mechanical mixing and slurrying methods until the pH was 9 to produce the required precipitate.

300 grams per liter of silicic compounds, namely solid containing in excess of 70% by weight complex silicate compounds, were added by mechanical means until the mixture had a thick mud consistency.

20 grams per liter of an alkaline earth metal compound, namely $Ca(OH)_2$, were then added to cause the silicic compound to react with the precipitate. The mixture rapidly thickened and was placed in a pile on the ground to await completion of the reaction. Within twenty-four hours, the material could be walked on and within thirty days, the compressive strength of the material was well over 3,000 pounds per square foot.

To test the stability and non-toxic nature of this solid product, 100 grams of product were leached with distilled water equivalent to heavy rain fall over a twenty-four hour period, and the analysis of the leachate was:

| | |
|---|---|
| pH | 9 |
| Cl | 94 mg/liter |
| $SO_4$ | 340 mg/liter |
| Mn | 0.02 mg/liter |
| Cu | 0.02 mg/liter |
| Zn | 0.04 mg/liter |
| Pb | 0.10 mg/liter |
| Ni | 0.04 mg/liter |
| Fe | 0.26 mg/liter |
| Cr | 0.06 mg/liter |

The safety of the solid product from an environmental point of view can readily be seen from the above results.

The solid product in this example resembled typical sedimentary soft shale as typically found in the earth. It did not break down under the action of water or other environmental action, and could not be readily identified as anything else but a typical complex silicate compound, such as forms solid sedimentary rock, shales, or mud stone.

EXAMPLE 2

The waste liquid treated in this example was from a tailings pond of a copper refinery, and among other polluting compounds contained metallic hydroxides and sewage sludge. 3 liters of the waste liquid were mixed with 0.1% per liter of dilute acidulated ferrous sulphate solution containing 4% by weight ferrous sulphate and 3% by weight sulphuric acid to adjust the pH of the liquid to 2 and effect the necessary reduction of the polluting compounds.

10 grams per liter of lime were then added to raise the pH to 9 and produce the required precipitate.

500 grams per liter of silicic compound in the form of sand and silt were then added, which gave the liquid a thick consistency.

To activate the silicic compound, 25 grams per liter of an alkaline earth metal compound, namely CaO was added to raise the pH to about 12.5.

The mixture then rapidly became stiff and within twenty-four hours was relatively hard. Within seven days, a compressive strength of more than 5,000 pounds per square foot was achieved.

On immersion in water, the solid product was only slightly softened and did not fall apart. In a leach test, the leachate had no odour and did not contain any detectable toxic elements. The pH of the leachate was 8.

EXAMPLE 3

The waste liquid in this case was tailings liquid from a uranium refinery operation, and contained polluting compounds such as pyrites. The tailings liquid also contained about 70% $SiO_2$.

This waste liquid was treated in generally the same way as the waste liquid in Example 2, except that it was not necessary to add a silicic compound since sufficient silicic compound was originally present in the waste liquid.

Similar results were obtained as in Example 2.

EXAMPLE 4

The waste liquid in this case was sewage sludge taken from various sewage plants.

In the test, 1 liter of sewage sludge was treated and diluted acidulated ferrous sulphate solution was added to sterilize the bacteria and react with toxic components until the pH was reduced from 8 to 3. It was noted that the offensive odour of the original sludge was eliminated at this point.

20 grams per liter of lime were then added to raise the pH to 8 and produce the required precipitate. 300 grams per liter of silicic compound in the form of soil were then added to produce a mud-like consistency.

30 grams per liter of an alkaline earth metal compound, namely CaO, was added to raise the pH to about 12.5 and initiate the solidification reaction.

The sludge thickened and, after several days, was like typical top soil.

Analysis of the product showed no detectable toxic elements in the leach test, and showed excellent slow release fertilizer properties with respect to nitrogen and phosphorous. The solid product in this case would therefore be an excellent material to spread on gardens or farm fields.

EXAMPLE 5

The waste liquid in this case was harbour dredgings taken from a harbour on one of the great lakes of Canada. These dredgings were known to contain putresible matter from sewage and were also known to be contaminated by mercury.

The same procedure as for Example 4 was followed, except that it was not necessary to add any silicic compound as sufficient silicates were contained in the original dredgings.

The solid product in this case was as good as that in Example 4. In particular, no mercury was detected when a sample was subjected to a leaching test.

EXAMPLE 6

The waste liquid in this case was mixed wastes from various industries over a wide area and contained polluting compounds from virtually every chemical industry. The mixture had an extremely foul smell.

The waste liquid was treated with acidulated ferrous sulphate solution to reduce the pH to 2, and was then treated with lime to raise the pH to 8. Silicic compounds, namely clays, were added to produce a thick mud consistency, and then an alkaline earth metal compound, namely $Ca(OH)_2$, was added to raise the pH to at least 12.5.

The waste liquid then solidified and has been accepted as clean fill material. The product is free of the original foul small, and resembled sound, good quality, dark grey soft mudstone analogous to typical soils found in the earth, such as sedimentary stone.

EXAMPLE 7

The waste liquid in this case was harbour dredging from a harbour on another great lake of Canada. The content of the dredging had been formed from the discharge of every conceivable type of industrial waste, and the various wastes had interacted with each other and formed complex precipitates in the silt of the harbour bed.

An analysis of toxic metals in the sludge dredged was as follows:

| | | |
|---|---|---|
| Cr | 1700 | ppm |
| Cu | 650 | " |
| Pb | 200 | " |
| Ni | 740 | " |
| Zn | 520 | " |
| Fe | 141,000 | " |
| Co | 1,000 | " |
| Ca | 194,000 | " |
| Mg | 11,600 | " |

The remaining material in the waste liquid was sewage sludge and silts of silicate compounds.

A similar procedure as in the previous examples was followed. Acidulated ferrous sulphate solution was added to reduce the pH to 3, lime was added to raise the pH to 8, and an alkaline earth metal compound was added to raise the pH to about 12.5. Addition of silicate compound was not required, as sufficient was already present in the waste liquid.

Immediately after this treatment, the offensive odour originally present in the waste liquid disappeared. Within two days, the material was hard enough to stand on and resembled dark grey sedimentary soft shale or mudstone. After one month, the material did not break down under water, and a leach test with distilled water revealed the following analysis in the leachate:

| | |
|---|---|
| Cr | 0.06 ppm |
| Cu | non detected |
| Pb | non detected |
| Ni | non detected |
| Zn | 0.02 ppm |
| Fe | 0.3 ppm |
| Co | non detected |
| pH | 7.1 |
| $SO_4$ | 1400 ppm |
| Cl | 268 ppm |
| K | 48 ppm |

| -continued | |
|---|---|
| Na | 4 ppm |

In the leach test, as in other leach tests in the previous example, 100 grams of the product were leached for twenty-four hours in 175 mls. of distilled water, which is equivalent to heavy rain fall over a twenty-four hour period.

By comparison, it should be mentioned that a piece of pure red clay from farmland in Ontario, Canada, was put through a similar leach test and the leachate was found to contain 1.4 ppm Fe.

The foregong description and, in particular, the examples given above, describe the wide capability of the present invention for the treatment of waste liquids containing polluting compounds, with their conversion into environmentally safe solid products.

Other embodiments within the scope of the invention will be readily apparent to one skilled in the art, the scope of the invention being defined in the appended claims.

I claim:

1. A method of treating a waste liquid containing polluting compounds, including reacting the waste liquid with an acidic ferrous salt solution to adjust the pH of the liquid to a value within the range of from about 2 to about 5 and to reduce polluting compounds in the waste liquid to a form capable of reacting with an alkali to produce a precipitate, reacting the adjusted waste liquid with an alkali to raise the pH of the liquid to a value within the range of from about 9 to about 12.5 and to produce said precipitate, and reacting the alkaline waste liquid with a silicic compound to form large complex silicate molecules with the precipitate and consequent solidification of the waste liquid into a stable, non-polluting solid.

2. A method according to claim 1 wherein the acidic ferrous salt solution is a solution containing ferrous sulphate and sulphuric acid.

3. A method according to claim 1 wherein the alkali is lime.

4. A method according to claim 1 wherein the alkali comprises lime and caustic soda.

5. A method according to claim 1 wherein silicic compound is a compound which becomes active to produce said large complex silicate molecules when the pH of the waste liquid is in the range of from about 9 to about 12.5, and is relatively inactive when the pH is below said range.

6. A method according to claim 1 wherein the silicic compound is selected from the group consisting of sodium silicate, cement, fly ash, general ash, siliceous slag, siliceous silt, clay, sand and soil of a silicic nature.

7. A method according to claim 1 wherein the adjusted liquid is reacted with an alkali to raise the pH to about 9 and to produce said precipitate, and an alkaline earth metal compound is added to raise the pH to a higher value and cause the silicic compound to form said large complex silicate molecules.

8. A method according to claim 1 wherein the alkali comprises caustic soda.

* * * * *